United States Patent
Bekemeier et al.

(10) Patent No.: US 9,080,020 B2
(45) Date of Patent: Jul. 14, 2015

(54) WATER-DISPERSIBLE SILICONE RESINS

(75) Inventors: Thomas Daniel Bekemeier, Birch Run, MI (US); Thomas Easton, Barry (GB); Yihan Liu, Midland, MI (US); Gary Michael Wieber, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/515,330

(22) PCT Filed: Dec. 21, 2010

(86) PCT No.: PCT/US2010/061498
§ 371 (c)(1),
(2), (4) Date: Jun. 12, 2012

(87) PCT Pub. No.: WO2011/087780
PCT Pub. Date: Jul. 21, 2011

(65) Prior Publication Data
US 2013/0030115 A1    Jan. 31, 2013

Related U.S. Application Data

(60) Provisional application No. 61/288,903, filed on Dec. 22, 2009.

(51) Int. Cl.
| | | |
|---|---|---|
| C08G 77/06 | (2006.01) | |
| C08G 77/26 | (2006.01) | |
| C08G 77/18 | (2006.01) | |
| C08J 3/05 | (2006.01) | |
| C08L 83/08 | (2006.01) | |
| C09D 183/08 | (2006.01) | |
| D06M 15/643 | (2006.01) | |

(52) U.S. Cl.
CPC ............... *C08G 77/26* (2013.01); *C08G 77/18* (2013.01); *C08J 3/05* (2013.01); *C08L 83/08* (2013.01); *C09D 183/08* (2013.01); *D06M 15/643* (2013.01); *C08G 77/06* (2013.01); *C08J 2383/08* (2013.01); *D06M 15/6436* (2013.01)

(58) Field of Classification Search
CPC ........ C08G 77/06; C08G 77/18; C08G 77/26; C08J 3/05; C08J 238/08; C06M 15/643; C06M 15/6436; C08L 83/08; C09D 183/08
See application file for complete search history.

(56) References Cited

U.S. PATENT DOCUMENTS

| | | | |
|---|---|---|---|
| 4,421,796 A | 12/1983 | Burril et al. | |
| 4,999,249 A * | 3/1991 | Deschler et al. | ............... 428/447 |
| 5,051,129 A * | 9/1991 | Cuthbert et al. | ................... 106/2 |
| 5,164,105 A * | 11/1992 | Ishino et al. | ................. 252/78.3 |
| 5,204,432 A * | 4/1993 | Saito et al. | ....................... 528/10 |
| 5,226,954 A | 7/1993 | Suzuki et al. | |
| 5,232,964 A | 8/1993 | Evans et al. | |
| 5,300,327 A | 4/1994 | Stark-Kasley et al. | |
| 5,319,049 A * | 6/1994 | Yoshioka et al. | ............... 528/10 |
| 5,695,551 A | 12/1997 | Buckingham et al. | |
| 5,919,296 A | 7/1999 | Be et al. | |
| 2003/0129419 A1 | 7/2003 | Chen et al. | |
| 2008/0242826 A1* | 10/2008 | Danner | ........................... 528/38 |

FOREIGN PATENT DOCUMENTS

| | | |
|---|---|---|
| JP | 60018548 | 1/1985 |
| JP | 10330687 | 12/1998 |
| WO | 2009128883 | 10/2009 |

OTHER PUBLICATIONS

I. Danielsson et al.: The definition of Microemulsion, Colloids and Surfaces, vol. 3, 1981, pp. 391-392.

* cited by examiner

*Primary Examiner* — Margaret Moore
(74) *Attorney, Agent, or Firm* — Baltazar Gomez

(57) ABSTRACT

A process for preparing an aqueous dispersion of a silicone resin is disclosed by reacting a mixture containing an alkylalkoxysilane and a cationic alkoxysilane to form a self dispersing silicone resin and subsequently combining the silicone resin with water to form the dispersion. The resulting dispersions are useful for forming coatings on various substrates that are essentially free of co-surfactants or volatile organic solvents.

3 Claims, No Drawings

WATER-DISPERSIBLE SILICONE RESINS

CROSS REFERENCE TO RELATED APPLICATIONS

This application is a U.S. national stage filing under 35 U.S.C. §371 of PCT Application No. PCT/US10/61498 filed on Dec. 21, 2010, currently pending, which claims the benefit of U.S. Provisional Patent Application No. 61/288,903 filed Dec. 22, 2009 under 35 U.S.C. §119 (e). PCT Application No. PCT/US10/61498, U.S. Provisional Patent Application No. 61/288,903 are hereby incorporated by reference.

BACKGROUND OF THE INVENTION

Resin emulsions stabilized with organic surfactants have several disadvantages that lead to poor properties when a coating is subjected to heat or sunlight. Once a film is coated on a substrate, the organic surfactants are not locked into place, and are free to migrate to other locations. This can lead to areas where the surfactant concentrates, and when exposed to heat or sunlight, the surface can yellow. Also these surfactants can cause water spotting, remaining hydrophilic and impacting the quality of the film. In general, organic surfactants are the only way to obtain a stable resin emulsion. A silicone resin dispersed in water is highly desired due to the need to eliminate using volatile organic compounds as the solvent or dispersion media. At present, the use of volatile organic compounds is the best way to deliver a silicone resin. The present inventors have discovered dispersions of certain silicone resins that nearly eliminate the need for volatile organic compounds.

BRIEF SUMMARY OF THE INVENTION

The present disclosure provides a process for preparing an aqueous dispersion of a silicone resin by reacting a mixture containing an alkylalkoxysilane and a cationic alkoxysilane to form a self dispersing silicone resin and subsequently combining the silicone resin with water to form the dispersion. The resulting dispersions are useful for forming coatings on various substrates that are essentially free of co-surfactants or volatile organic solvents.

DETAILED DESCRIPTION OF THE INVENTION

The present disclosure provides a process for preparing an aqueous dispersion of a silicone resin comprising:

I) reacting a mixture containing;
   a) 80 to 99.9% by weight of an alkylalkoxysilane of the formula $$R^1_a Si(OR^2)_{4-a}$$

b) 0.1 to 20% by weight of a cationic alkoxysilane of the formula $$R^3_b R^4 Si(OR^5)_{3-b}$$

where;
   $R^1$ is an alkyl group containing 1 to 30 carbon atoms,
   $R^2$ and $R^5$ are independently selected from the group consisting of hydrogen, alkyl groups containing 1 to 4 carbon atoms, $CH_3C(O)$—, $CH_3CH_2C(O)$—, $HOCH_2CH_2$—, $CH_3OCH_2CH_2$—, and $C_2H_5OCH_2CH_2$—, $R^3$ is an alkyl group containing 1 to 4 carbons,
   $R^4$ is a monovalent hydrocarbon having at least one quaternary ammonium group substituent,
   a is 1 or 2,
   b is 0, 1 or 2, II) combining 5 to 95 wt % of the mixture of step I) with 5 to 95 wt % of water to form an aqueous dispersion.

a) The Alkylalkoxysilane

Component a) is an alkylalkoxysilane of the formula $$R^1_a Si(OR^2)_{4-a}$$

where $R^1$ is an alkyl group containing 1 to 30 carbon atoms, $R^2$ is selected from the group consisting of hydrogen, alkyl groups containing 1 to 4 carbon atoms, $CH_3C(O)$—, $CH_3CH_2C(O)$—, $HOCH_2CH_2$—, $CH_3OCH_2CH_2$—, and $C_2H_5OCH_2CH_2$—, the subscript "a" is 1 or 2. In the formula, $R^1$ represents an alkyl group having 1-30 carbon atoms, alternatively 1-12 carbon atoms, alternatively 3-10 carbon atoms, alternatively 6-9 carbon atoms, or alternatively 8 carbon atoms.

Component a) may be a single alkylalkoxysilane or a mixture of alkylalkoxysilanes, as described above. Some suitable alkoxysilanes are methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane, butyltrimethoxysilane, butyltriethoxysilane, hexyltrimethoxysilane, n-octyltriethoxysilane, n-octyltrimethoxysilane, i-octyltrimethoxysilane, i-octyltriethoxysilane, dimethyldimethoxysilane, dimethyldiethoxysilane, diethyldimethoxysilane, diisobutyldimethoxysilane, dibutyldiethoxysilane, dihexyldimethoxysilane.

Such alkylalkoxysilanes are known and are commercially available. Representative examples are described in U.S. Pat. No. 5,300,327 (Apr. 5, 1994), U.S. Pat. No. 5,695,551 (Dec. 9, 1997), and U.S. Pat. No. 5,919,296 (Jul. 6, 1999).

In one embodiment, $R^1$ and $R^2$ is methyl, that is component a) is methyltrimethoxysilane.

b) The Cationic Alkoxysilane

Component b) is a cationic alkoxysilane of the formula $$R^3_b R^4 Si(OR^5)_{3-b}$$

where; $R^3$ is an alkyl group containing 1 to 4 carbons, such as methyl, ethyl, propyl, or butyl,
$R^4$ is a monovalent hydrocarbon group having at least one quaternary ammonium group substituent,
$R^5$ is selected from the group consisting of hydrogen, alkyl groups containing 1 to 4 carbon atoms, $CH_3C(O)$—, $CH_3CH_2C(O)$—, $HOCH_2CH_2$—, $CH_3OCH_2CH_2$—, and $C_2H_5OCH_2CH_2$—,
the subscript "b" is 0, 1 or 2, alternatively "b" is 0.

The monovalent hydrocarbon group $R^4$ in the cationic alkoxysilane formula may have the formula $$-R^7 N^+ R^8 R^9 R^{10} X, \text{ where;}$$

$R^7$ links to the silicon atom of the cationic alkoxysilane formula and is a linear or branched alkylene group containing 1 to 4 carbon atoms, such methylene, ethylene, propylene, butylene, or isobutylene. Alternatively, $R^7$ is propylene or isobutylene, $R^8$, $R^9$, and $R^{10}$ are independently selected from hydrocarbon groups containing 1 to 20 carbon atoms, providing the total number of carbon atoms from $R^8$, $R^9$, and $R^{10}$ is at least 6 carbon atoms, X is selected from a halide; such as fluoride, chloride, bromide, or iodide, acetate, or tosylate.

Representative, non-limiting examples of the $R^4$ substituent include;

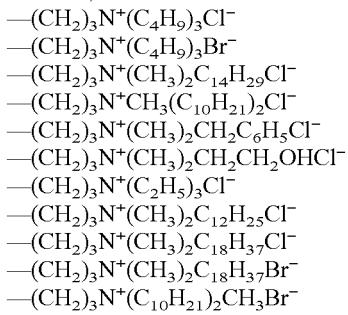

Cationic alkoxysilanes are known and many are available commercially. Exemplary commercial examples include; Dow Corning® 5700, 5772, and Q9-6346.

In one embodiment, $R^3$ and $R^5$ are methyl and $R^4$ is —$(CH_2)_3N^+(CH_3)_2C_{18}H_{37}Cl^-$ in the cationic alkoxysilane formula.

Additional silanes and/or siloxane precursors may be added to the mixture of step I). These include silanes and/or siloxane precursors that provide M or Q type siloxy units to the resulting silicone resins. For example, certain amounts of methoxytrimethylsilane and/or tetraethoxysilane may be added in the mixture of step I) to introduce M and Q siloxy units respectively.

Step I) of the present process involves forming a mixture of components a) and b) (as described above) at the various proportions followed by mild mixing. Mixing may be effected by simple stirring or shaking. Then, components a) and b) are reacted together in a hydrolysis and condensation reaction. These reactions are conducted with the addition of water and catalyst. Typically, a strong aqueous acid solution, such as 37% aqueous hydrochloric acid, is added to effect these reactions. Catalysts for this reaction are not limited to hydrochloric acid, other acids, bases, or organic catalysts may be used.

Typically, the reaction should occur under an inert atmosphere. Without the inert atmosphere, water vapor from the air can react with some of the alkoxy groups which will interfere with the calculated degree of reaction based on the amount of water added to the reaction.

Rate of addition of water and catalyst (such as aqueous hydrochloric acid) should be monitored to avoid the formation of solid gel particles. Slow stir speed can also impact the formation of gel particles during addition. While these gel particles can be filtered out, it will cause a lower overall molecular weight for the product. For example, a stirring speed of 300 rpm is a reasonable speed for mixing the contents of the flask.

The reaction should proceed at elevated temperatures. Typically, the reaction mixture is heated initially to reflux temperatures, and then subsequently to a temperature ranging from 120-140° C., alternatively from 125-135° C. to remove alcohol (such as methanol) reaction products. Important to the degree of polymerization of the final product is the time used for reflux which effects the reaction of water with the alkoxy groups of the silane. Subsequent heating to about 130° C. during the collection of the alcohol with a Dean-Starke trap removes alcohol, hydrochloric acid, and any other low boiling point impurities. Subsequent distillations can also be used to remove impurities as well as some of the low molecular weight oligomers if so desired.

The reaction product resulting from step I) of the present process has a silicone resinous structure(s). In one embodiment, the silicone resinous reaction product contains an organopolysiloxane having an empirical formula of:

$$R_c^4 R_d^6 Si(OZ)_e(O)_{\frac{4-c-d-e}{2}}$$

where
$R^4$ is as defined above,
$R^6$ is $R^3$ or $R^1$ as defined above,
Z is a hydrogen atom, $R^2$ or $R^5$
c=0.0012 to 0.25,
d=0.4988 to 1.8
with the proviso that c+d may range from 0.5 to 1.8 and,
e may range from 0.0 to 3.0.

The silicone resinous structure of the present invention are organopolysiloxanes. Organopolysiloxanes are polymers containing siloxane units independently selected from $(R_3SiO_{0.5})$, $(R_2SiO)$, $(RSiO_{1.5})$, or $(SiO_2)$ siloxy units, referred herein as M, D, T, and Q siloxy units respectively, where R may be any monovalent organic group. These siloxy units can be combined in various manners to form cyclic, linear, or branched structures. The chemical and physical properties of the resulting polymeric structures can vary, depending on the type and number of siloxy units present in the organopolysiloxane. For example, organopolysiloxanes can be volatile or low viscosity fluids, high viscosity fluids/gums, elastomers or rubbers, and resins. The organopolysiloxane of the present invention may have any combination of $(R_3SiO_{0.5})$, $(R_2SiO)$, $(RSiO_{1.5})$, or $(SiO_2)$ siloxy units, providing the organopolysiloxane has the empirical formula as described above. The amount of each siloxy unit in the resulting silicone resin will depend on the selection and amounts of silanes used in the reaction mixture of step I).

The reaction product from step I) is then combined with water to form a dispersion. According to step II of the present process 5 to 95 wt % of the mixture of step I) is combined with 5 to 95 wt % of water to form an aqueous dispersion. Mixtures of these components is typically subjected to mixing or shear in devices such as a rotor stator mixer, a homogenizer, a sonolator, a microfluidizer, a colloid mill, mixing vessels equipped with high speed spinning or with blades imparting high shear, or sonication to effect the formation of the emulsion. While energy-intense mixing or high shear is helpful, one advantage of the present process is that it is not absolutely required. Low-energy mixing or gentle stir often suffice to achieve a dispersion or emulsion of the present invention stable for application purpose. Furthermore, another advantage of the present invention is that the dispersions or emulsions do not require the addition of further surfactants or co-surfactants.

In one embodiment, the present emulsions are essentially free of any co-surfactants. While not wishing to be bound by any theory, the present inventors believe the reaction products resulting from the reaction of the cationic alkoxysilane and alkylalkoxysilane are able to form a water dispersible silicone resin which can also function as a surfactant to stabilize emulsion thereof. As such, the addition of further surfactants or co-surfactants may not be necessary. As used herein "essentially free of co-surfactant" means the exclusion of the purposeful addition of a surfactant or co-surfactant in quantities greater than 1000 ppm to the present emulsions. It is recognized some minor quantities of co-surfactant may be present in the inventive compositions due to impurities or by addition of such for other unintended uses.

The present disclosure further provides a method of forming a coating by applying the present dispersions onto a surface and curing the emulsion. Curing may be effected by simply drying the dispersion, or alternatively heating the coating to accelerate the removal of water.

Films cast from this dispersion can find utility as a high-temperature coating replacing those organopolysiloxane coatings which have excellent ability to withstand high-temperatures but must be delivered in organic solvent. As lower volatile organic content usage restrictions increase, there will be a drive for materials which will fill the void of those no longer allowed due to the more stringent environmental restrictions.

The compositions in accordance with the present disclosure can be employed in the treatment of various surfaces encompassing concrete and masonry products, textiles, paper, paperboard, leather products, and cellulosic materials. Examples of leather products are garments, shoes and boots. Textiles include awnings, tents, tarpaulins, rainwear, covers, slickers, canvas, asbestos, fiberglass, natural fibers, peat moss, natural and synthetic yarns, woven and nonwoven materials, carpets and carpet fibers. Cellulosic materials contemplated herein for treatment include wood, wood products, fiberboard, cedar, redwood, firs, plywood, and structural timbers. Concrete and masonry surfaces which may be treated include products and surfaces of heavy and light weight concrete, gypsum, concrete blocks, cinder blocks, soft mud bricks, sand lime bricks, drain tiles, ceramic tiles, sandstone, plaster, clay bricks, natural stones and rocks, roofing tiles, calcium silicate bricks, asbestos cement, slag stones and bricks, stucco, limestone, macadam, marble, grout, mortar, terrazzo, clinker, pumice, terra cotta, porcelain, adobe, coral, dolomite and asphalt. Noncementitious surfaces may be treated with the compositions of the present invention including perlite, cellular glass, vermiculite, mica and diatomaceous earth. Representative of such materials in the examples set forth below are (i) a neutral cementitious sandstone; (ii) a basic cementitious material which was grout; and (iii) a cellulosic material which was wood in the form of pine, redwood and cedar.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %. All measurements were conducted at 23° C. unless indicated otherwise.

Example 1

A mixture of methyltrimethoxysilane (267.48 grams) and 3-(trimethoxysilyl)-propyl-N,N-dimethyl-octadecylammonium chloride, 43 wt % in methanol (Dow Corning® Corporation DC-5700, 13.31 grams) were hydrolyzed with 0.51 wt % aqueous HCl (27.08 grams). The reaction mixture was heated to reflux for 60 minutes, then heated to 130° C. for 70 minutes during which by-product methanol was removed via distillation. After cooling, methanol (27.3 grams) was added. The mixture was heated to 120° C. at 99 torr for 60 minutes to remove methanol by distillation. Cooling, methanol addition (27.3 grams), and vacuum distillation cycle was repeated. The resulting material was filtered to yield a yellow, translucent, semi-solid product.

Example 2

Following the same procedure outlined in Example 1, methyltrimethoxysilane (270.18 grams) and 3-(trimethoxysilyl)-propyl-N,N-dimethyl-octadecylammonium chloride, 43 wt % in methanol (6.51 grams) were added to the reaction vessel. This was hydrolyzed with 0.51 wt % aqueous HCl (27.27 grams). The reaction mixture was heated to reflux for 66 minutes then increased to 110° C. and held for 150 minutes. This distillation removed the by-product methanol. After cooling, methanol (27.3 grams) was added. Heating was begun again attaining a temperature of 120° C. with vacuum pressure of 70 torr and held for 21 minutes. At the end, the temperature was cooled to 55° C. and again methanol (27.3 grams) was added. The distillation process was repeated and it was held at temperature and pressure for 33 minutes. The resin was filtered with slight pressure through a cartridge filter. Viscosity of the reaction product was measured with a Brookfield Digital Viscometer Model LVT DV-I using an LVT-3 spindle at 60 rpm and found to be 14.0 cP. Weight average and number average molecular weight by GPC was 439 and 392 grams/mole respectively.

Example 3

To a 2.5 oz cylindrical glass, 4.01 grams of the reaction product obtained from Example 2 and 36.00 grams of deionized water were added. The mixture was sheared with a Misonix® Sonicator 3000 with an ultrasonic converter for 30 seconds at full intensity. There was a 30 second break followed by another 30 second shear at full intensity. Subsequent to the shear a white, opaque dispersion of the resin was noted. Particle size measurement was taken via a Nanotrac™ 150 Particle Analyzer (Microtrac Inc.) obtaining a monodisperse particle size distribution centered around 320 nanometers. After processing the dispersion, a film was cast into a 6-cm diameter polystyrene Petri dish. The resultant film was transparent, hard, and tough.

Example 4

Following the procedure in Example 1, methyltrimethoxysilane (264.78 grams) and N-trimethoxysilylpropyl-N,N,N-trimethyl ammonium chloride 50% in Methanol (16.40 grams) were added to a reaction vessel. To hydrolyze the silanes, a 0.68 wt % aqueous HCl solution was used (27.32 grams). The reaction was heated to reflux for 60 minutes. Heating was then increased to 127° C. for 51 minutes as the by-product methanol was removed and collected. The contents were cooled and methanol (27.3 grams) was added as a wash solution. The mixture was heated and vacuum was applied. After cooling the methanol strip process was repeated. The final product was a hazy/translucent liquid with a slight white tint. Viscosity was measured to be 12.0 cP and molecular weight of 462 grams/mole.

Example 5

Following the procedure of Example 3, 3.99 grams of the reaction product from Example 4 and 36.92 grams of deionized water were sheared using the Misonix Sonicator 3000. A monodispersed particle size distribution centered around 223 nanometers was obtained. The resulting dispersion was a white, opaque liquid. Films cast in a 6-cm polystyrene Petri dish were soft and transparent with a blue tint.

Comparative Example

Following the procedure of Example 3, 4.00 grams of Wacker MSE 100 and 36.00 grams of deionized water were sheared using the Misonix Sonicator 3000. This silicone resin did not disperse in water. It formed a resinous layer on the bottom of the vial.

The invention claimed is:

1. A process for preparing an aqueous dispersion of a silicone resin comprising:

I) reacting a mixture containing:
  a) 80 to 99.9% by weight of an alkylalkoxysilane of the formula $$R^1_a Si(OR^2)_{4-a}$$

b) 0.1 to 20% by weight of a cationic alkoxysilane of the formula $$R^3_b R^4 Si(OR^5)_{3-b}$$

where:
  $R^1$ is an alkyl group containing 1 to 30 carbon atoms,
  $R^2$ and $R^5$ are independently selected from the group consisting of hydrogen, alkyl groups containing 1 to 4 carbon atoms, $CH_3C(O)-$, $CH_3CH_2C(O)-$, $HOCH_2CH_2-$, $CH_3OCH_2CH_2-$, and $C_2H_5OCH_2CH_2-$,
  $R^3$ is an alkyl group containing 1 to 4 carbons,
  $R^4$ is a monovalent hydrocarbon having at least one quaternary ammonium group substituent,
  a is 1 or 2,
  b is 0, 1 or 2,
  under an inert atmosphere at reflux temperature, and then subsequently to a temperature ranging from 120-140° C. to form a reaction product comprising a silicone resin; and II) combining 5 to 95 wt % of the reaction product of step I) with 5 to 95 wt % of water to form an aqueous dispersion, wherein the aqueous dispersion does not contain further surfactants and co-surfactants.

2. The process of claim 1 wherein aqueous hydrochloric acid is used to effect the reaction.

3. The process of claim 1 wherein the reaction product of step I) comprises an organopolysiloxane resin having an empirical formula of:

$$R^4_c R^6_d Si(OZ)_e (O)_{\frac{4-c-d-e}{2}}$$

where
  $R^4$ is as defined above,
  $R^6$ is $R^3$ or $R^1$ as defined above,
  Z is a hydrogen atom, $R^2$ or $R^5$
  c=0.0012 to 0.25,
  d=0.4988 to 1.8
  with the proviso that c+d may range from 0.5 to 1.8 and, e may range from 0.0 to 3.0.

* * * * *